(12) United States Patent
Wendelsdorf et al.

(10) Patent No.: US 8,909,453 B2
(45) Date of Patent: Dec. 9, 2014

(54) SYSTEM AND METHOD OF MEASURING AND MONITORING TORQUE IN A ROTORCRAFT DRIVE SYSTEM

(71) Applicant: Bell Helicopter Textron Inc., Fort Worth, TX (US)

(72) Inventors: Joseph W. Wendelsdorf, Arlington, TX (US); Keith Hale, Joshua, TX (US); Walter West Riley, Richardson, TX (US); Charles Eric Covington, Colleyville, TX (US); Brian E. Tucker, Fort Worth, TX (US)

(73) Assignee: Bell-Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 13/722,005

(22) Filed: Dec. 20, 2012

(65) Prior Publication Data

US 2013/0184959 A1    Jul. 18, 2013

Related U.S. Application Data

(60) Provisional application No. 61/585,983, filed on Jan. 12, 2012.

(51) Int. Cl.
*G06F 17/00* (2006.01)
*G01M 13/02* (2006.01)
*G01M 5/00* (2006.01)
*B64C 27/04* (2006.01)

(52) U.S. Cl.
CPC ............... *G06F 17/00* (2013.01); *G01M 13/02* (2013.01); *G01M 5/0016* (2013.01); *B64C 27/04* (2013.01)
USPC .............................................. 701/99; 701/3

(58) Field of Classification Search
CPC ..... B60W 10/06; G07C 3/00; G05B 19/4065; G01L 3/00; G01L 5/00
USPC ................ 701/3, 29, 29.1, 29.4, 30, 31, 31.6, 701/31.9, 99; 702/33, 34, 41; 73/114.15, 73/114, 13, 862.08, 862.29, 862.31; 340/425, 438, 439; 60/39.282; 416/31, 416/43
See application file for complete search history.

(56) References Cited

U.S. PATENT DOCUMENTS 3,129,904 A * 4/1964 Hanson ...................... 244/17.19
4,733,361 A   3/1988 Krieser et al.
(Continued)

FOREIGN PATENT DOCUMENTS

EP           2296064 A2    3/2011
WO      2005015332 A2    2/2005

OTHER PUBLICATIONS

James T. McKenna, "Operation & Maintenance: HUMS on Board", Oct. 1, 2006, Rotor & Wing Magazine http://www.aviationtoday.com/rw/training/military/Operations-and-Mainenance-HUMS-on-Board_6245.html.*

(Continued)

*Primary Examiner* — Mary Cheung
*Assistant Examiner* — Rodney Butler
(74) *Attorney, Agent, or Firm* — Noah A. Tevis

(57) ABSTRACT

A method of optimizing an operation of a rotorcraft includes measuring actual usage of the tail rotor drive shaft during operation of the rotorcraft, the actual usage including at least a torque measurement. The method further includes a step of adjusting a life of the tail rotor drive shaft based upon the measuring of the actual usage. Another method of the present disclosure includes determining a main rotor mast torque by measuring a tail rotor drive shaft torque and deriving a main rotor mast torque by considering the measured tail rotor drive shaft torque and a total torque output of an engine. A system of the present disclosure is configured for determining the main rotor mast torque in part by measuring the tail rotor torque.

6 Claims, 4 Drawing Sheets

(56) References Cited

U.S. PATENT DOCUMENTS

| | | | |
|---|---|---|---|
| 5,188,511 A * | 2/1993 | Ebert | 416/25 |
| 5,239,468 A * | 8/1993 | Sewersky et al. | 701/31.9 |
| 5,929,431 A | 7/1999 | Hadley | |
| 6,053,452 A * | 4/2000 | Yamakawa et al. | 244/17.19 |
| 6,322,324 B1 | 11/2001 | Kennedy et al. | |
| 6,351,713 B1 | 2/2002 | Board et al. | |
| 6,453,669 B2 | 9/2002 | Kennedy et al. | |
| 6,768,938 B2 | 7/2004 | McBrien et al. | |
| 7,013,210 B2 | 3/2006 | McBrien et al. | |
| 7,027,953 B2 | 4/2006 | Klein | |
| 7,032,860 B1 * | 4/2006 | Kirk et al. | 244/17.19 |
| 7,225,062 B2 | 5/2007 | Aubourg | |
| 7,684,936 B2 | 3/2010 | Bechhoefer | |
| 7,719,416 B2 | 5/2010 | Arms et al. | |
| 7,844,404 B2 | 11/2010 | Ling et al. | |
| 7,983,809 B2 | 7/2011 | Kell et al. | |
| 7,984,146 B2 | 7/2011 | Rozak et al. | |
| 8,068,997 B2 | 11/2011 | Ling et al. | |
| 8,079,274 B2 | 12/2011 | Mian et al. | |
| 8,131,420 B2 | 3/2012 | Lynch et al. | |
| 2002/0018716 A1 | 2/2002 | Kennedy et al. | |
| 2002/0165647 A1 | 11/2002 | Glenn, III et al. | |
| 2004/0176902 A1 | 9/2004 | McBrien et al. | |
| 2004/0193386 A1 | 9/2004 | Flynn et al. | |
| 2005/0096873 A1 | 5/2005 | Klein | |
| 2006/0030975 A1 * | 2/2006 | Certain | 701/3 |
| 2006/0064210 A1 | 3/2006 | Aubourg | |
| 2006/0235707 A1 | 10/2006 | Goldstein et al. | |
| 2007/0260726 A1 | 11/2007 | Rozak et al. | |
| 2008/0036617 A1 | 2/2008 | Arms et al. | |
| 2008/0041141 A1 * | 2/2008 | Discenzo | 73/66 |
| 2008/0272915 A1 | 11/2008 | Day | |
| 2009/0083050 A1 | 3/2009 | Eltman et al. | |
| 2009/0211381 A1 | 8/2009 | Zakrzewski et al. | |
| 2009/0216398 A1 | 8/2009 | Lynch et al. | |
| 2009/0281735 A1 | 11/2009 | Bechhoefer | |
| 2009/0300379 A1 * | 12/2009 | Mian et al. | 713/300 |
| 2010/0031756 A1 | 2/2010 | Mian et al. | |
| 2010/0042283 A1 | 2/2010 | Kell et al. | |
| 2010/0057277 A1 | 3/2010 | Goodrich et al. | |
| 2010/0153025 A1 | 6/2010 | Ling et al. | |
| 2010/0161244 A1 | 6/2010 | Ghoshal et al. | |
| 2010/0204931 A1 | 8/2010 | Ling et al. | |
| 2010/0219987 A1 | 9/2010 | Isom et al. | |
| 2010/0235108 A1 | 9/2010 | Adams et al. | |
| 2010/0235109 A1 | 9/2010 | Zhao et al. | |
| 2011/0040719 A1 | 2/2011 | Aguilar et al. | |
| 2011/0046996 A1 | 2/2011 | Foucher et al. | |
| 2011/0057071 A1 | 3/2011 | Sahasrabudhe et al. | |
| 2011/0245999 A1 | 10/2011 | Kordonowy | |
| 2011/0264310 A1 | 10/2011 | Bates et al. | |
| 2011/0285527 A1 | 11/2011 | Arms et al. | |
| 2012/0067671 A1 | 3/2012 | Sammataro et al. | |
| 2012/0078544 A1 | 3/2012 | Lynch et al. | |

OTHER PUBLICATIONS

Canadian Office Action from related Canadian Patent Application No. 2,802,172, dated Feb. 13, 2014, 3 pages.

European Partial Search Report from related European Patent Application No. 13150076.1, dated May 19, 2014, 6 pages.

* cited by examiner

SYSTEM AND METHOD OF MEASURING AND MONITORING TORQUE IN A ROTORCRAFT DRIVE SYSTEM

BACKGROUND

1. Technical Field

The present disclosure relates to system and method of measuring and monitoring torque in a rotorcraft drive system.

2. Description of Related Art

Typically, the mast torque in a rotorcraft main rotor mast, such as a helicopter main rotor mast, can be measured by measuring the rotational phase shift, or torsion, between a precision gear attached to the top of the helicopter mast and an identical precision gear attached to the bottom of the helicopter mast. The rotational phase shift between these two gears, which is caused by the twisting of the helicopter mast, can be measured using an inductance device. However, such a system that measures rotational phase shift is less desirable in some rotor mast implementations.

Hence, there is a need for an improved system and method for measuring torque in a main rotor mast. Further, there is a need for a system and method for measuring torque in a tail rotor drive shaft.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
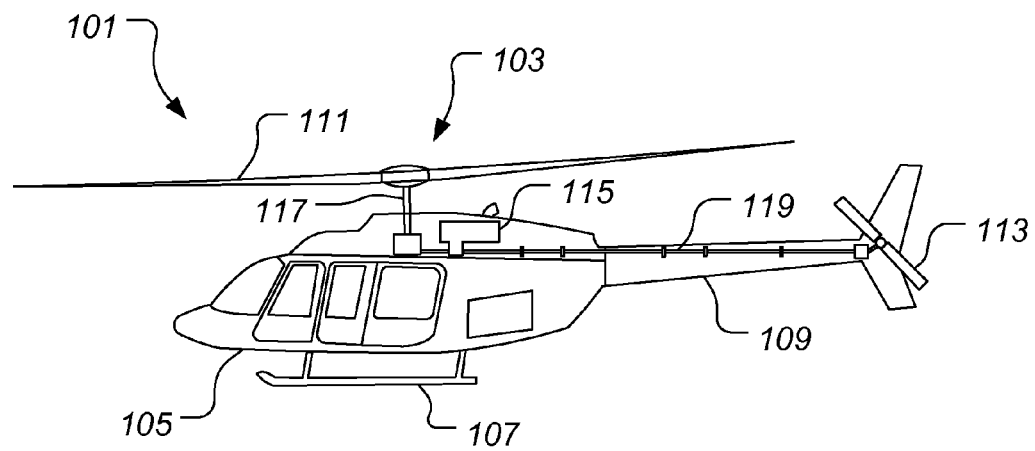
FIG. 1 is a side view of a rotorcraft having a torque measuring sensor system, according to an example embodiment.

Referring to FIG. 1 in the drawings, a rotorcraft 101 is illustrated. Rotorcraft 101 has a rotor system 103 with a plurality of main rotor blades 111. Rotorcraft 101 further includes a fuselage 105, landing gear 107, a tail member 109, and tail rotor blades 113. An engine 115 supplies torque to a main rotor mast 117 and a tail rotor drive shaft 119, for the rotating of main rotor blades 111 and tail rotor blades 113, respectively. The pitch of each main rotor blade 111 can be selectively controlled in order to selectively control direction, thrust, and lift of rotorcraft 101. Further, the pitch of tail rotor blades 113 can be selectively controlled in order to selectively control yaw of rotorcraft 101.

Figure 2:
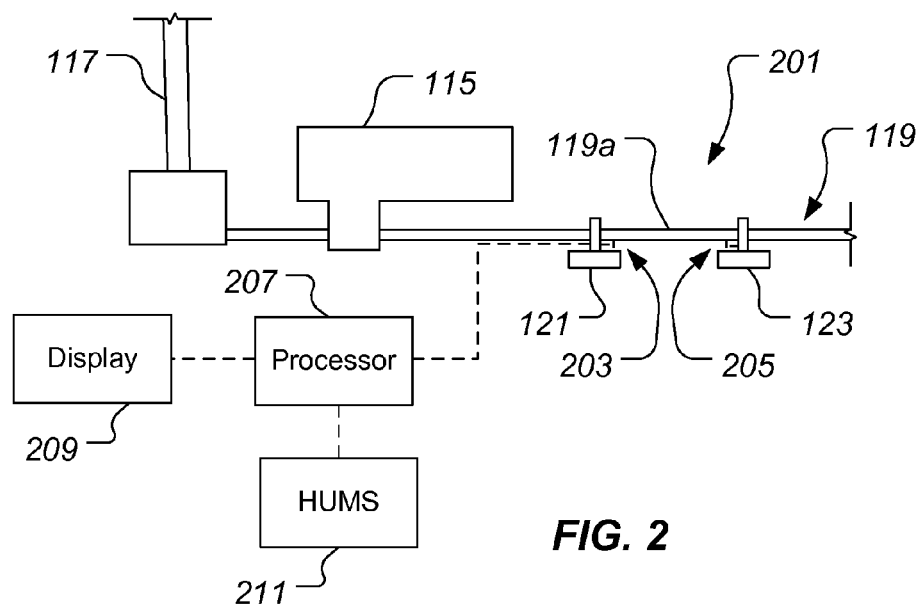
FIG. 2 is a side schematic view of a tail rotor drive shaft torque measuring sensor system, according to an example embodiment.

Referring now also to FIG. 2, a tail rotor drive shaft torque measuring sensor system 201 is illustrated in conjunction with the drive system of rotorcraft 101. Sensor system 201 can be one of a variety of sensor systems capable of measuring torque in drive shaft. In one embodiment, sensor system 201 is a variable reluctance sensor system comprising a combination of magnetic members and coil members, for example. Other embodiments of sensor system 201 can include Hall Effect sensors, optical sensors, to name a few.

Sensor system 201 can utilize a first hangar bearing 121 and a second hangar bearing 123 as stationary sensor mounting platforms, while rotating sensor components are adjacently located on tail rotor drive shaft 119. Tail rotor drive shaft 119 can include a plurality of drive shaft segments, such as drive shaft segment 119a. Preferably, sensor system 201 is associated with a drive shaft segment, such as segment 119a, that is a forwardly located drive shaft segment. Aftwardly located drive shaft segments tend to experience more positional variances due to the deflections in tail member 109, which can cause undesired complexity or errors. Sensor system 201 can include a first sensor assembly 203 associated with a forward portion of segment 119a, as well as a second sensor assembly 205 associated with an aft portion of segment 119a.

During operation, torque produced by engine 115 is transferred to tail rotor blades 113 via tail rotor drive shaft 119. The torque load on tail rotor drive shaft 119 during operation can cause a variable torsional deflection. The torsional deflection can be referred to as a "wind-up" or "phase shift", for example. Further, the torsional deflection can be the result of torsional loading in a variety of operational conditions. Sensor system 201 is configured to detect the difference in "phase shift" between the torsional deflections measured from first sensor assembly 203 and second sensor assembly 205. Sensor system 201 can include a temperature sensor to obtain temperature data of tail rotor drive shaft 119. Measuring a temperature of tail rotor drive shaft 119 allows the processor to factor thermal expansion when analyzing the torsional phase shift of tail rotor drive shaft 119. A processor 207 is configured to process the measurement data from sensor system 201. In one embodiment, processor 207 communicates the measurement data to a pilot of rotorcraft 101 in a display 209. More specifically, display 209 can provide a visual indication of real-time torque values, as well as past torque values, experienced in tail rotor drive shaft 119.

System 201 can also include a health and usage monitoring system ("HUMS") 211. Processor 207 can be configured to communicate measured torque data to HUMS 211 so that HUMS 211 can evaluate and provide useful health and usage data to an operator of rotorcraft 101. For example, if rotorcraft 101 were to experience a relatively high tail rotor drive shaft torque loading over a certain period of time, then HUMS 211 can communicate that information to an operator so that the operator can timely perform inspection and maintenance of bearings, as well as other systems, in accordance with the high torque loading, thus improving operational safety. Conversely, if rotorcraft 101 were to experience a relatively low tail rotor drive shaft torque loading over a certain period of time, then HUMS 211 can communicate that information to an operator so that the operator can delay unnecessary inspection and maintenance of bearings, as well as other systems, in accordance with the low torque loading, thus saving expenses related to inspection and maintenance. Further, HUMS 211 can be configured to store and communicate a torque history, such as an over-torque history that may credit or debit a life span of the tail rotor drive shaft 119, and related components. Further, HUMS 211 can be configured to recognize and alert an operator to vibratory or deflection anomalies that may reflect a malfunctioning bearing or other drive system related component.

Figure 4:
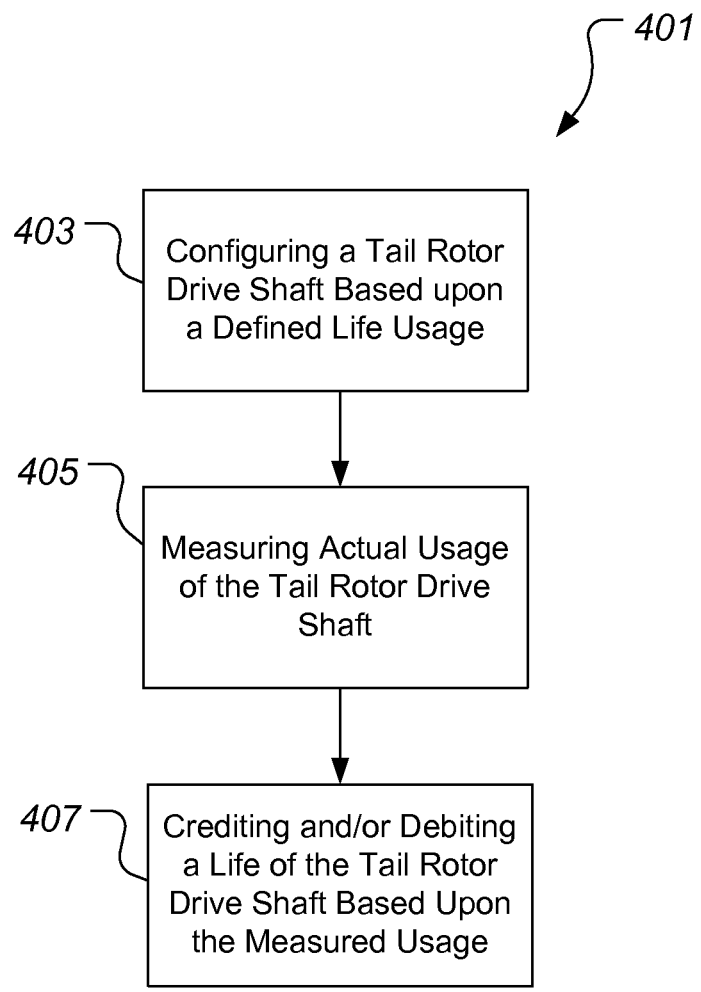
FIG. 4 is a schematic view of a method of optimizing a tail rotor drive shaft, according to an example embodiment.

Referring briefly to FIG. 4, a method 401 of optimizing a tail rotor drive shaft is schematically depicted. Method 401 allows a tail rotor drive shaft to be optimally sized so that certain rotorcraft operators can realize a benefit for conservative operations. Conventionally, a rotorcraft component, such as a tail rotor drive shaft was designed to survive a predetermined fatigue life, typically in terms of hours used. As such, the tail rotor drive shaft was designed to survive the life usage of the most abusive operator. An example of an abusive operator can be a tree hauler that puts a substantial amount and frequency of torque loading on the tail rotor drive shaft during usage of the rotorcraft by hauling logs. An operator that used the tail rotor drive shaft in a conservative manner was essentially penalized by having a tail rotor drive shaft that was heavier than necessary. Further, the conservative operator had to replace the tail rotor drive shaft when the predetermined life of the tail rotor drive shaft had expired, even though the tail rotor drive shaft was still usable since it had been conservatively used. Further, the conservative operator was penalized by having the requirement for inspection requirements that were more frequent than necessary.

Method 401 includes a step 403 of configuring a tail rotor drive shaft based upon a defined life usage. In one example embodiment, the defined life usage is approximately a median operator usage amount; however, the defined life usage can be any defined usage amount. In one embodiment, the defined life usage is based upon an accumulation of the amount of fatigue inducing torque cycles experienced by the tail rotor drive shaft during a plurality of operations. Preferably, the defined life usage is measurably less than what an abusive operator would place on the tail rotor drive shaft. Therefore, step 403 includes configuring tail rotor drive shaft 119 with a more efficient (lighter weight) design since the defined life usage is less than a conventional life usage based an abusive rotorcraft operator.

Method 405 includes a step 405 of measuring actual usage of the tail rotor drive shaft. Sensor system 201 and HUMS 211, described further herein, are particularly well suited for implementing step 405 of method 401. For example, HUMS 211 can store and communicate torque history of the tail rotor drive shaft, as well any other data that may be relevant to the evaluation of the health and life of the tail rotor drive shaft.

Method 405 further includes a step 407 of crediting and/or debiting a life of the tail rotor drive shaft based upon the measured data in step 405. A conservative operator of rotorcraft 101 can derive usage credits that reduce inspection intervals and increase the replacement life span of the tail rotor drive shaft. Similarly, an abusive operator of rotorcraft 101 can derive usage debits that increase inspection intervals and decrease the replacement life span of the tail rotor drive shaft. In one embodiment, step 407 can be implemented throughout the life of the rotorcraft. For example, steps 405 and 407 can be implemented in real time. In another embodiment, step 407 is implemented at an interval, such as once a week. Further, it should be appreciated that an operator can receive a usage credit for a period of conservative usage, then later receive a usage debit for a period of abusive usage, for example.

One benefit of method 401 is that the tail rotor drive shaft, such as tail rotor drive shaft 119, can be more efficiently designed, therefore allowing a user realize better performance of rotorcraft 101. Further, method 401 encourages and rewards conservative use the tail rotor drive shaft during operation of rotorcraft 101.

Figure 3:
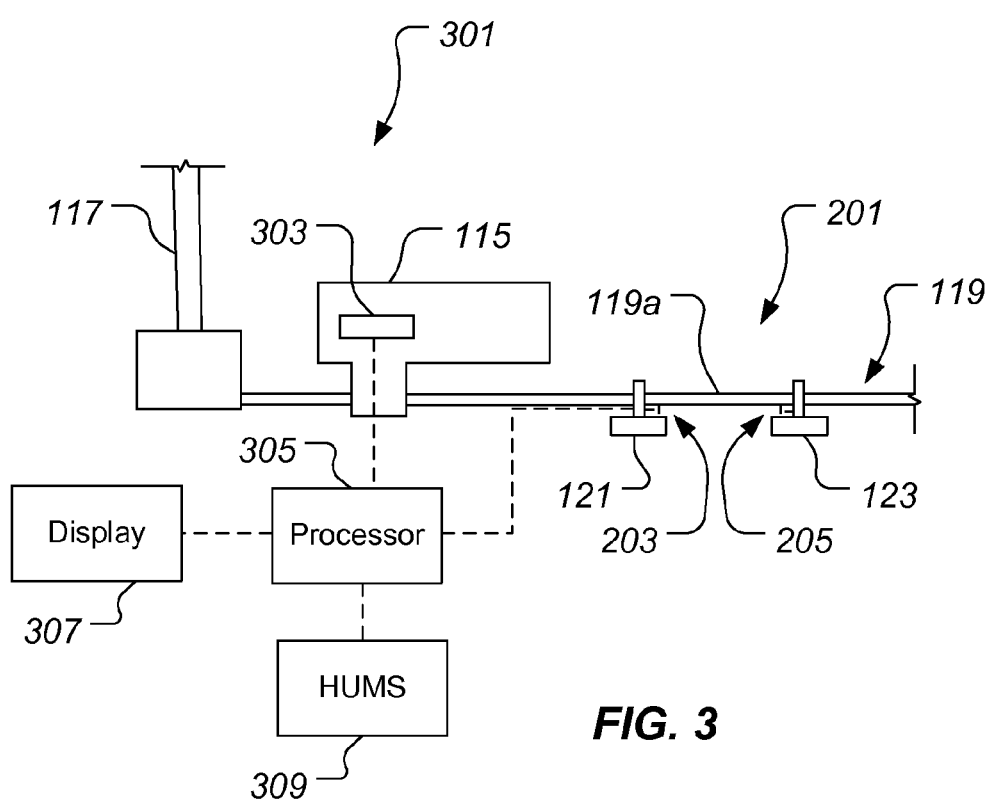
FIG. 3 is a side schematic view of a main rotor mast torque measuring system, according to an example embodiment.

Referring now to FIG. 3, an embodiment of a main rotor mast torque measuring system 301 is illustrated. It is desirable to measure and monitor torque loading in main rotor mast 117; however, certain physical implementations of main rotor mast 117 can make the variable torsional deflection experienced in main rotor mast 117 difficult and complicated to directly measure. For example, a main rotor mast 117 having a substantially high torsional stiffness will typically exhibit a relatively low torsional deflection for a given torque load. As such, directly measuring the torsional deflection, such as a "wind-up" or "phase shift" deflection, can be inaccurate without using expensive and highly calibrated instrumentation. Therefore, main rotor mast torque measuring system 301 utilizes a tail rotor drive shaft sensor system 201 (further discussed herein with regard to FIG. 2) to derive a torque in main rotor mast 117.

Main rotor mast torque measuring system 301 can include a total engine torque output sensor 303 in communication with a processor 305. Processor 305 is configured to analyze data from total engine torque output sensor 303 and tail rotor drive shaft sensor system 201 to derive the torque in main rotor mast 117. In one embodiment, processor 305 uses the tail rotor drive shaft torque measurement obtained by system 201 and the total output torque measured by output sensor 303 to derive the torque in main rotor mast 117 by using conservation of energy/power. It should be appreciated that total engine torque output sensor 303 can be the sum of torque from a plurality of engines. A health and usage monitoring system ("HUMS") 309 is configured similar to HUMS 211, except having additional functionality for evaluating and providing useful health and usage data pertaining to torque in main rotor mast 117 to an operator of rotorcraft 101. Further, a display 307 is configured similar to display 209 such that processor 305 can communicate torque data to a pilot of rotorcraft 101 in a display 209. More specifically, display 307 can provide a visual indication of real-time torque values, as well as past torque values, experienced in main rotor mast 117 and/or tail rotor drive shaft 119.

Processor 305 can be configured to consider any power consumed by an auxiliary gearbox, or other power consuming system, when employing conservation of energy/power principles to derive the torque in main rotor mast 117. Further, processor 305 can be configured to consider other mechanical losses that may be necessary to derive an accurate torque value in main rotor mast 117.

Main rotor mast torque measuring system 301 can be particularly desirable in conjunction with a main rotor mast 117 that has a high torsional stiffness, as well as in other situations. For example, it can be particularly desirable in some aircraft implementations to specifically monitor torque in tail rotor drive shaft 119 so as to acquire data that is relevant to the health of the tail rotor drive system. Thus, system 301 allows the torque in main rotor mast 117 to be derived without adding an independent main rotor mast torque measuring sensor system.

Further, calculating main rotor mast torque by measuring tail rotor drive shaft torque can result in a more accurate reading of both main rotor mast torque and tail rotor drive shaft torque, as compared to calculating tail rotor drive shaft torque from a main rotor mast torque measurement. Most of the engine power is transferred to the main rotor mast. By way of illustration, approximately 80% of the engine power can be transferred to the main rotor mast, while the other 20% of the engine power can be transferred to the tail rotor drive shaft, not accounting for auxiliary power consuming systems. As such, if the tail rotor drive shaft torque were to be calculated from a main rotor mast torque measurement, then even a small amount of error (such as 5% error) in the main rotor mast torque measurement is magnified when the tail rotor drive shaft torque is derived therefrom. Therefore, it can be more accurate to measure the tail rotor drive shaft torque, and then calculate the main rotor mast torque therefrom.

Figure 5:
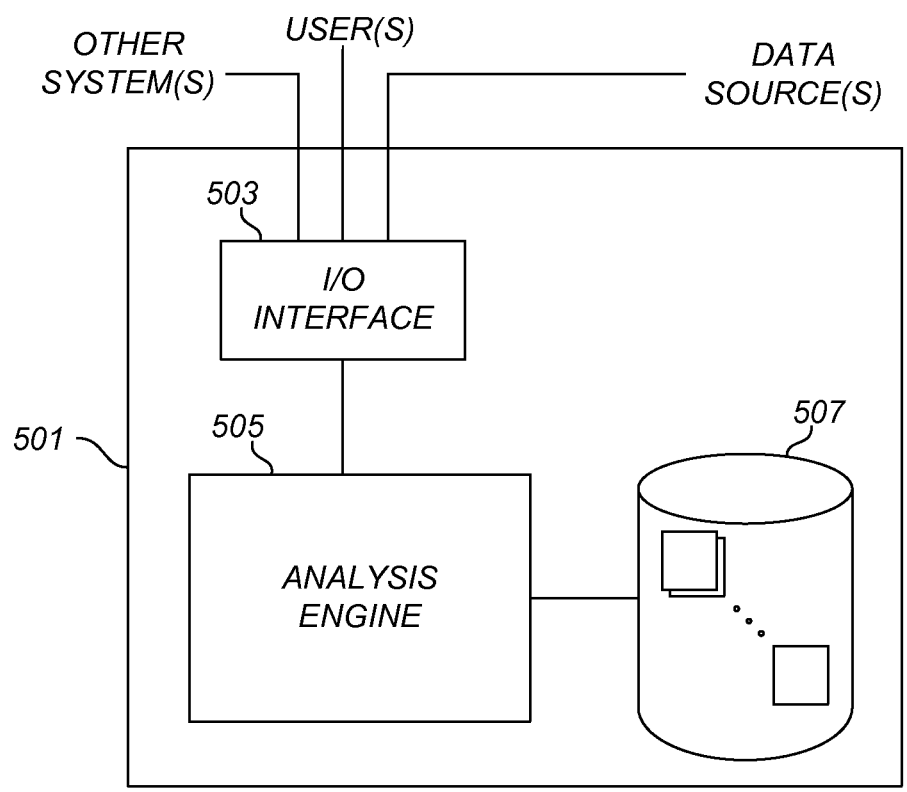
FIG. 5 is a schematic view of a computer system, according to an example embodiment.

Referring now also to FIG. 5, a computer system 501 is schematically illustrated. Computer system 501 is configured for performing one or more functions with regard to the operation of methods and systems disclosed herein. Further, any processing and analysis can be partly or fully performed by computer system 501. Computer system 501 can be partly or fully integrated with other aircraft computer systems.

The system 501 can include an input/output (I/O) interface 503, an analysis engine 505, and a database 507. Alternative embodiments can combine or distribute the input/output (I/O) interface 503, analysis engine 505, and database 507, as desired. Embodiments of the system 501 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 503 can provide a communication link between external users, systems, and data sources and components of the system 501. The I/O interface 503 can be configured for allowing one or more users to input information to the system 501 via any known input device. Examples can include a keyboard, mouse, touch screen, and/or any other desired input device. The I/O interface 503 can be configured for allowing one or more users to receive information output from the system 501 via any known output device. Examples can include a display monitor, a printer, cockpit display, and/or any other desired output device. The I/O interface 503 can be configured for allowing other systems to communicate with the system 501. For example, the I/O interface 503 can allow one or more remote computer(s) to access information, input information, and/or remotely instruct the system 501 to perform one or more of the tasks described herein. The I/O interface 503 can be configured for allowing communication with one or more remote data sources. For example, the I/O interface 503 can allow one or more remote data source(s) to access information, input information, and/or remotely instruct the system 501 to perform one or more of the tasks described herein.

The database 507 provides persistent data storage for system 501. While the term "database" is primarily used, a memory or other suitable data storage arrangement may provide the functionality of the database 507. In alternative embodiments, the database 507 can be integral to or separate from the system 501 and can operate on one or more computers. The database 507 preferably provides non-volatile data storage for any information suitable to support the operation of system 201, system 301, and method 401, including various types of data discussed further herein. The analysis engine 505 can include various combinations of one or more processors, memories, and software components.

The sensor system of the present application provides significant advantages, including: 1) enabling the derivation of a torque measurement in a tail rotor drive shaft; 2) providing a system for determining a main rotor mast torque value without directly measuring main rotor mast torque; 3) providing a system for determining a main rotor mast torque value where the rotor mast torsional stiffness makes direct measurement of main rotor mast torque undesirable; 4) providing a system for using main rotor mast torque and tail rotor drive shaft torque in a health and usage monitoring system; 5) providing a method of optimizing a tail rotor drive shaft; and 6) providing a method of encouraging and rewarding conservative use of tail rotor drive shaft during operation of the rotorcraft.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A method of optimizing an operation of a rotorcraft, the rotorcraft having a tail rotor drive shaft, the method comprising:

storing a torque history of the tail rotor drive shaft, the torque history including a plurality of torque measurements over a period of time that indicate a degree to which the tail rotor drive shaft was torque loaded during the period of time;

determining an actual usage of the tail rotor drive shaft during operation of the rotorcraft based upon the torque history;

adjusting a defined life of the tail rotor drive shaft based upon the actual usage;

wherein the plurality of torque measurements are derived from a tail rotor drive shaft torque measuring sensor system.

2. The method according to claim 1, wherein the step of adjusting the defined life of the tail rotor drive shaft includes crediting additional life of the tail rotor drive shaft.

3. The method according to claim 1, wherein the step of adjusting the defined life of the tail rotor drive shaft includes debiting life of the tail rotor drive shaft.

4. The method according to claim 1, wherein the step of adjusting the defined life of the tail rotor drive shaft includes reducing or lengthening an inspection period of the tail rotor drive shaft.

5. The method according to claim 1, wherein the step of adjusting the defined life of the tail rotor drive shaft includes reducing or lengthening a retirement life of the tail rotor drive shaft.

6. The method according to claim 1, wherein the step of determining the actual usage is performed by a computer processor.

* * * * *